United States Patent Office 3,751,435
Patented Aug. 7, 1973

3,751,435
PROCESS FOR RECOVERY OF PIVALOLACTONE FROM POLYMERS THEREOF
Servaas van der Ven and Frederik L. Binsergen, Amsterdam, Netherlands, assignors to Shell Oil Company, New York, N.Y.
No Drawing. Filed Jan. 14, 1971, Ser. No. 106,579
Claims priority, application Netherlands, Feb. 13, 1970, 7002062
Int. Cl. C07d 3/00
U.S. Cl. 260—343.9
9 Claims

ABSTRACT OF THE DISCLOSURE

Pivalolactone is recovered from polymers thereof by a process which comprises heating the polymer in the presence of a depolymerization catalyst at a temperature above 245° C. and a vapor pressure of said pivalolactone less than one atmosphere to form pivalolactone vapor, and rapidly condensing the pivalolactone vapor.

---

The present invention provides a novel, direct process for the recovery of pivalolactone, i.e. alpha,alpha dimethyl beta-propiolactone from polymers in which pivalolactone is the sole or principal beta-lactone component, by heating the polymer in the presence of a depolymerization catalyst to form pivalolactone vapor, and rapidly condensing the vapor to recover the monomer.

In the utilization of materials in the production of polymers and the manufacture of shaped articles therefrom, commercial practices often result in the unavoidable collection of waste material such as low polymers, trimmings, damaged articles, fibers, yarns and the like. It is often not practical or economical to effect recovery by, for example, melting, grinding or shredding such materials, but it is often preferable to recover the expensive monomer therefrom which can be again converted into useful polymer.

The recovery of lactones from linear polyesters by means of depolymerization is known, see, for example, Houben-Weyl, vol. 6, part 2, pp. 738–9, and K. C. Frisch et al., Ring-opening Polymerization, 1969, pp. 294–6. This method is particularly applicable to lactones with large rings, i.e. lactones having at least 5 ring carbon atoms. Generally, when thermal depolymerization is applied, polymers of beta-lactones do not give the beta-lactone, but decomposition products thereof; probably as a result of the greater ring tension of the beta-lactones. For instance, British Pat. 655,387 discloses that poly-beta-propiolactone gives acrylic acid. The formation of a beta-lactone has been reported in French Pat. 1,321,323 in the pyrolysis of dialkyl ketene; the lactone formed is a dimer of dialkyl ketene, which is stated to be less sensitive to decomposition than, for instance, diketene, another beta-lactone. It is also known that polypivalolactone can give $CO_2$ and isobutene when heated to above its melting point. It is possible to use an indirect route to recover monomer from polypivalolactone. According to U.S. 3,432,548 polypivalolactone is converted into an alpha,alpha-dimethyl-beta-halogen propionic acid with strong HBr or HCl, which acid can then be converted again into pivalolactone in known manner.

It has now been found that pivalolactone can be obtained directly in good yields by high temperature catalytic depolymerization of polypivalolactone. The process according to the invention comprises heating the polymer in the presence of a depolymerization catalyst at a temperature above 245° C. and a vapor pressure of said pivalolactone less than one atmosphere to form pivalolactone vapor, and rapidly condensing the pivalolactone vapor.

The invention is particularly important for the recovery of pivalolactone from waste polymer that is produced in manufacturing processes such as spinning and injection-moulding as well as in the re-cycling of damaged and/or discarded shaped articles of pivalolactone polymers.

The process according to the invention can be applied to copolymers of pivalolactone which contain, say, at least 75% weight and preferably at least about 90% weight of units derived from pivalolactone. The invention is, however, especially important for the recovery of pivalolactone from its homopolymers.

The catalyst which is applied in the process according to the invention is at least one chemical compound from either of the following two categories:

(1) Basic substances, which may be Brönstedt or Lewis bases. Examples of these are a hydroxide of potassium, sodium or calcium; a salt of a strong base and a weak acid, such as the potassium or sodium salt of pelargonic acid, stearic acid or beta-hydroxpivalic acid, barium benzoate, sodium carbonate, bicarbonate, phosphate and borate. Basic compounds that are preferably applied are alkali metal salts of pivalic acid, e.g., sodium and potassium pivalate. The basicity of the compound can be determined with the help of the $pK_b$ value of the basic compound, which value must be lower than 12, preferably lower than 10 (measured at 25° C. in a 0.01–0.1 N aqueous solution).

(2) Neutral salts that dissolve in esters. Examples of these are sodium iodide, lithium chloride, calcium iodide, tetrabutylphosphonium bromide. The solubility of said neutral salts at room temperature (25° C.) in ethyl acetate expressed in moles per liter must be at least $10^{-3}$ preferably higher than $10^{-2}$ mole/l. If desired, the catalyst may comprise a mixture of two or more of said neutral salts and/or basic compounds.

The catalyst is generally applied in a quantity of at least 0.5% w., calculated on the polymer of pivalolactone, preferably in a quantity greater than 3% w. preferably in the range from about 3 to about 25% by weight.

The depolymerization is performed at a temperature above 245° C. At temperatures above 300° C., particularly between 305 and 350° C., the formation rate of pivalolactone greatly increases, without an appreciable increase in the decomposition of the monomer. These temperatures above 300° C. are therefore preferred. If desired, the pivalolactone can, during the depolymerization, be dissolved or dispersed in a high-boiling solvent, such as a petroleum oil. However, the polymer of pivalolactone is preferably depolymerized "dry," i.e., in the absence of a solvent.

Almost quantitative yields can be obtained if this "dry" depolymerization is performed in such a way that the polymer is gradually added to the catalyst, preferably at a rate which is not higher than the depolymerization rate. According to the last mentioned embodiment practically no molten polymer phase will be found in the depolymerization vessel since the lactone is formed as the polymer is added.

Essential in the process, according to the invention, is a rapid condensation of the pivalolactone formed, in other words, the pivalolactone formed should not remain at temperatures above 250° C. for a time of more than 60 seconds, and preferably for not more than 5 seconds. The application of vacuum promotes a rapid removal of the lactone formed from the depolymerization zone. As used herein, the term "vacuum" refers to a vapor pressure of the lactone lower than 1 atmosphere absolute. This may be achieved at atmosphere pressure by, for example, passing an inert gas, such as nitrogen, over or through the depolymerizing polymer, resulting that the partial pressure of the lactone is reduced. Preferably, however, a subatmospheric pressure is applied in the depolymerization vessel. The subatmospheric pressure is suitably lower than 0.3 atmosphere and preferably lower than about 0.1 atmosphere, e.g., 0.01 atmosphere.

The lactone formed by depolymerization is cooled and condensed immediately, for example, in a cooling vessel at a suitable low temperature, e.g., −30° C. Naturally, this temperature is dependent on the particular vacuum applied. If desired, the depolymerization vessel may be provided with a short fractionating section or column in which oligomers of pivalolactone are condensed, flow back into the depolymerization vessel and depolymerize further to lactone.

EXAMPLES (1) Into a 50-ml. flask, heated to 306° C., 5 g. of polypivalolactone and 250 mg. of sodium pivalate were introduced. The pressure was 0.1 mm. Hg. The pivalolactone vapor that formed during half an hour was passed, via a short connecting tube, into a vessel cooled to −160° C. and condensed. Yield: 80%.

(2) Into a 100-ml. glass vessel, heated to 320° C., 5 g. of sodium pivalate was introduced. In the course of one hour 30 g. of polypivalolactone in the form of nibs were gradually added to the vessel and which depolymerized almost immediately. The lactone vapor that formed was passed through a reflux condenser with a top temperature of 90° C. at a pressure of 10 cm. Hg. The condensed oligomers flowed back into the depolymerization vessel. The lactone vapor was passed, via a short connecting tube, into a cooling vessel maintained at −60° C. and condensed. Yield: 100%.

We claim as our invention:

1. A process for the recovery of pivalolactone from a polymer of pivalolactone which contains at least 75% weight of units derived from pivalolactone which comprises:
   (A) heating the polymer in the presence of at least 0.5% w. calculated on polymer of a depolymerization catalyst selected from at least one of (1) Brönstedt or Lewis bases having a $pK_b$ value lower than 12 and (2) neutral salts having a solubility in ethyl acetate at 25° C. of at least $10^{-3}$ mole per liter, at a temperature above 245° C. and a vapor pressure of said pivalolactone less than one atmosphere to form pivalolactone vapor; and
   (B) condensing the pivalolactone vapor whereby the pivalolactone does not remain at a temperature above 250° C. for a time of more than 60 seconds.

2. A process as in claim 1 wherein the catalyst is a basic substance having a $pK_b$ value below 12.

3. A process as in claim 2 wherein the catalyst is an alkali metal salt of pivalic acid.

4. A process as in claim 1 wherein the amount of catalyst that is present is greater than 3% by weight, on polypivalolactone.

5. A process as in claim 1 wherein the polymer is heated to a temperature above 300° C.

6. A process as in claim 1 wherein the polymer is heated at a temperature between 305 and 350° C.

7. A process as in claim 7 wherein the polymer is added to the catalyst at a rate not exceeding the depolymerization rate.

8. A process as in claim 1 wherein said pivalolactone formed is at a temperature above 250° C. for not more than 5 seconds.

9. A process as in claim 1 wherein the vapor pressure of said lactone is less than 0.1 atmosphere.

References Cited
UNITED STATES PATENTS 3,161,656  2/1964  Elam _____ 260—343.9

DONALD G. DAUS, Primary Examiner

A. M. T. TIGHE, Assistant Examiner